United States Patent

Curran et al.

[15] 3,673,189
[45] June 27, 1972

[54] TETRACYCLIC ISOQUINOLINE DERIVATIVES

[72] Inventors: William Vincent Curran, Pearl River; Leon Goldman, Nanuet, both of N.Y.

[73] Assignee: American Cyanamid Company, Stamford, Conn.

[22] Filed: Jan. 5, 1971

[21] Appl. No.: 104,141

[52] U.S. Cl. .................260/289 R, 260/286 R, 260/289 A, 424/258
[51] Int. Cl. .......................................................C07d 39/00
[58] Field of Search ..................................260/289 R, 289 A

[56] References Cited

UNITED STATES PATENTS

| 3,131,191 | 4/1964 | Douglas | 260/289 R |
| 3,376,305 | 4/1968 | Cava | 260/289 A |
| 3,466,288 | 9/1964 | Hansen | 260/289 X |

OTHER PUBLICATIONS

Weisbach et al. Jour. Med. Chem. Vol. 6 91-7 (1963)
Gilbert et al. Jour. Am. Chem. Soc. Vol. 86 p. 694- 696 (1964)
Ishiwata et al. in Chem. Abstr. Vol. 71, 1a61168y (1969)

Primary Examiner—Donald G. Daus
Attorney—Edward A. Conroy, Jr.

[57] ABSTRACT

Compounds with the structures

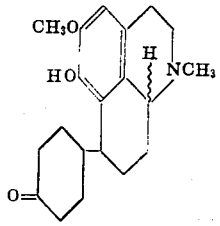 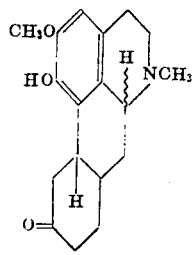

are prepared from homologous intermediates and are useful as analgesic and antiinflammatory agents.

4 Claims, No Drawings

TETRACYCLIC ISOQUINOLINE DERIVATIVES

BRIEF SUMMARY OF THE INVENTION

This invention relates to new organic compounds and, more particularly, is concerned with (±)-1,2,3,8,9,9a-hexahydro-6-hydroxy-5-methoxy-1-methylspiro[7H-benzo[de]quinoline-7,1'-cyclohexane]-4'-one (I) and (±)-4,5,6,6a,7,7a,8,9,11,11a-decahydro-1-hydroxy-2-methoxy-6-methyl-10H-dibenzo[de,g]-quinolin-10-one (II). The novel compounds of the present invention may be represented by the following structural formulas:

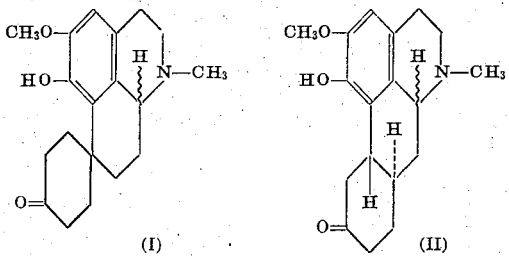

DETAILED DESCRIPTION OF THE INVENTION

The novel compounds of the present invention are white crystalline solids having characteristic melting points and absorption spectra. The free bases are appreciably soluble in common organic solvents such as chloroform, ethanol and acetone but are relatively less soluble in water.

The free bases of this invention form acid-addition salts with a variety of organic and inorganic salt-forming reagents. Thus, acid-addition salts, formed by admixture of the organic free base with an equivalent amount of an acid, suitably in a neutral solvent, are formed with such pharmaceutically acceptable acids as sulfuric, phosphoric, hydrochloric, hydrobromic, citric, lactic, tartaric, acetic, gluconic, ascorbic, and the like. For purposes of this invention, the organic free bases are equivalent to their non-toxic acid-addition salts.

(±)-1,2,3,8,9,9a-hexahydro-6-hydroxy-5-methoxy-1-methylspiro[7H-benzo[de]quinoline-7,1'-cyclohexane]-4'-one (I) may be prepared as set forth in the following reaction scheme:

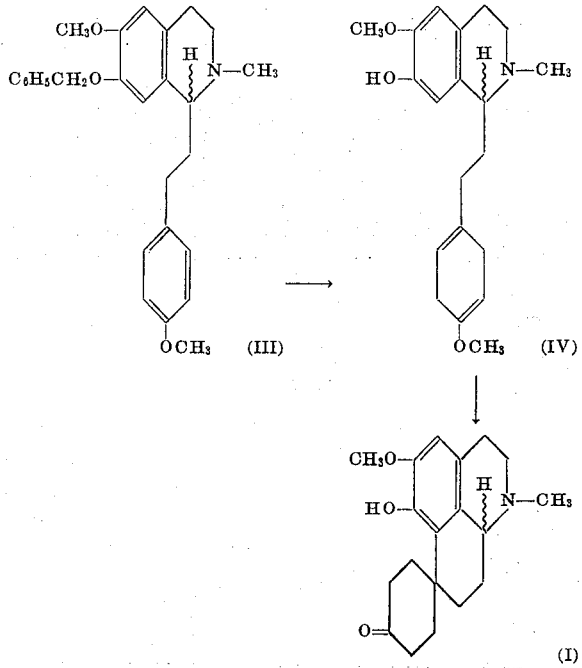

In accordance with the above reaction scheme, (±)-7-(benzyloxy)-1,2,3,4-tetrahydro-6-methoxy-1-(p-methoxyphenethyl)-2-methylisoquinoline (III) hydrochloride is reacted with a mixture of lithium and ammonia in tetrahydrofuran and t-butanol in a dry ice-methanol bath for 4–4.5 hours. The p-methoxyphenethyl group is selectively reduced and the O-benzyl group undergoes hydrogenolysis to give the novel enol ether (±)-1,2,3,4-tetrahydro-6-methoxy-1-[2-(4-methoxy-1,4-cyclohexadien-1-yl)ethyl]-2-methyl-7-isoquinolinol (IV). Cyclization of (IV) is effected by heating with 85 percent phosphoric acid for several hours to produce the tetracyclic spiroketone (I).

(±)-4,5,6,6a,7,7a,8,9,11,11a-decahydro-1-hydroxy-2-methoxy-6-methyl-10H-dibenzo[de,g]quinolin-10-one (II) may be prepared in an analogous manner as set forth in the following reaction scheme:

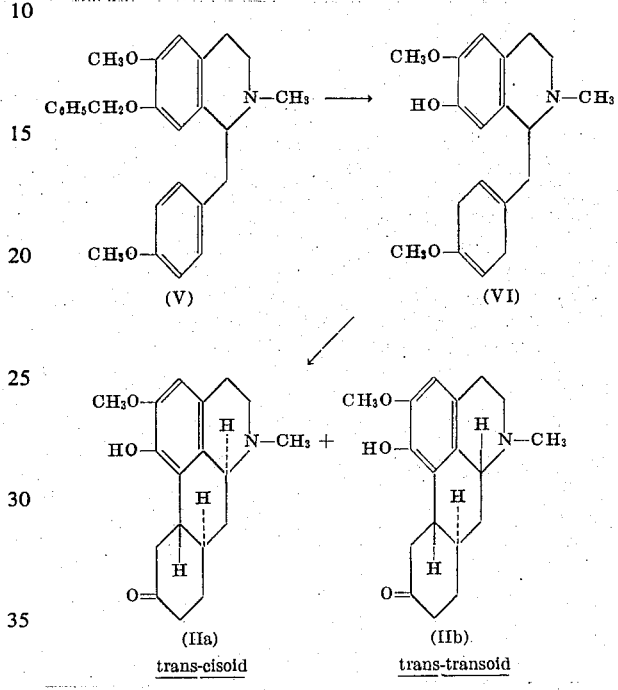

(±)-7-(benzyloxy)-1,2,3,4-tetrahydro-6-methoxy-1-(p-methoxybenzyl)-2-methylisoquinoline (V) hydrochloride is reduced as described above for (III) to afford the novel enol ether (±)-1,2,3,4-tetrahydro-6-methoxy-1-[2-(4-methoxy-1,4-cyclohexadien-1-yl)-methyl]-2-methyl-7-isoquinolinol (VI) which is, in turn, heated with 85 percent phosphoric acid on a steam bath for 3.0 hours with the formation of a mixture of two diastereoisomeric tetracyclic ketones, (±)-trans-cisoid and trans-transoid-4,5,6,6a,7,7a,8,9,11,11a-decahydro-1-hydroxy-2-methoxy-6-methyl-10H-dibenzo[de,g]quinolin-10-ones (IIa and IIb). The mixture is separated by liquid-liquid partition chromatography on diatomaceous earth to afford one isomer of m.p. 161°–163°C. in major amount and a second isomer of m.p. 176°–178°C. in minor amount. Assignment of trans-cisoid and trans-transoid stereochemistry to these isomers is not possible with the data on hand.

The novel compounds of the present invention are active analgetics when measured by the "writhing syndrome" test for analgetic activity as described by Siegmund et al., Proceedings of the Society for Experimental Biology and Medicine, Vol. 95, p. 729 (1957), with modifications. This method is based upon the reduction of the number of writhes following the intraperitoneal injection of 1 mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3-minute period commencing 15 minutes after injection of the phenyl-p-quinone. A compound is considered active if it reduces the total number of writhes in two test mice from a control value of approximately 30 per pair to a value of 18 or less. The following table summarizes the relative activity of the present compounds as active analgetics.

| Compound | Dose mg./kg. of body weight | Number of Writhes Pair No. 1 | Pair No. 2 |
|---|---|---|---|
| (±)-1,2,3,8,9,9a-hexahydro-6-hydroxy-5-methoxy-1-methylspiro[7H-benzo[de]quinoline-7,1'-cyclohexane]-4'one isomer, m.p. 161°-163°C., of (±)-4,5,6,6a,7,7a,8,9,-11,11a-delahydro1-hydroxy-2-methoxy-6-methyl-10H-dibenzo[de,g]quinolin-10-one | 100 | 0 | 3 |
| | 100 | 13 | 7 |

Experiments were conducted to determine analgesia by a modification of the method of Randall and Selitto (Arch. Int. Pharmacodyn. 111:409–419, 1957). This method was used to measure the pain threshold of rats whose paws were made sensitive to pressure by injection of a 20 percent aqueous suspension (0.1 ml.) of brewer's yeast into the plantar surface of the left hind paw. The pressure in grams which, when applied to the inflamed paw, elicited a sudden struggle or vocalization was recorded. A maximum (cut-off) pressure of 250 grams was employed. Control rats respond at a pressure of about 25 grams. A ratio of post/pretreatment reaction thresholds was calculated. The following table summarizes the results.

| Compound | Dose mg./kg. of body weight | Post-treatment/Pretreatment Reaction Threshold | |
|---|---|---|---|
| | | Test 1 4 rats | Test 2 4 rats |
| isomer, m.p. 161°–163°C., of (±)-4,5,6,6a,7,7a,8,9-11,11a-decahydro-1-hydroxy-2-methoxy-6-methyl-10H-dibenzo[de,g]quinolin-10-one | 200 | 1.71 | 1.72 |

These results correspond to a 71 percent increase in pain threshold.

A supplementary procedure which also indicates an analgetic mode of action is the rat tail-flick method described by F. E. D'Amour and D. L. Smith, J. Pharmacol. Exptl. Therap., Vol. 72, p. 74 (1941), with modifications. The compounds (generally as hydrochloride salts in 0.9 percent saline) are administered subcutaneously to groups of five rats each. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesia is an approximate 100 percent increase in response time over controls. Established clinically active analgetics such as meperidine, codeine, morphine, etc., are active in the above test. If desired, an effective dose for 100 percent increase in response time over controls may be determined from the results obtained from several graded dose levels. When tested by this procedure using a "low intensity" heat stimulus calibrated to produce an average 10–12 second response time in untreated animals (controls), (±)-1,2,3,8,9,9a-hexahydro-6-hydroxy-5-methoxy-1-methylspiro[(7H-benzo[de]quinoline-7,1'-cyclohexane]-4'-one, at 50 mg./kg. i.p., produced an average response time of 22 seconds.

The novel compound (±)-1,2,3,8,9,9a-hexahydro-6-hydroxy-5-methoxy-1-methylspiro[7H-benzo[de]quinoline-7,1'-cyclohexane]-4'-one possesses anti-inflammatory properties as determined by the carrageenin-induced rat paw edema test as follows. In this test, weanling Sherman strain rats ranging in weight from 50–55 grams were used and fed standard laboratory diet ad libitum. The test compound is administered to the rats by gavage (250 milligrams per kilogram in a volume of 1.7 milliliters of buffered aqueous starch) 1 hour prior to challenge with carrageenin. The challenge agent, carrageenin, is obtained from Marine Colloids 2 Edison Place, Springfield, N.J., and prepared as a sterile 1 percent suspension in 0.09 percent aqueous sodium chloride. A volume of 0.05 milliliter is injected using a 26 gauge needle into the planar tissue of the right hind paw of treated and untreated rats. Measurements of the volumes of the carrageenin-inflamed right (challenged) paw and left (unchallenged) paw are determined 4 hours subsequent to the carrageenin challenge. The method of determining paw volumes is carried out essentially as described by C. A. Winter, et al., in Proc. Soc. Exptl. Biol. Med. 111: pp. 544–547 (1962) using mercury immersion. The differences in volume of the two paws of each rat is considered to be the volume of the carrageenin-induced edema. The mean edema volume of eight control rats divided by the mean edema volume of two treated rats is calculated and designated the C/T efficacy ratio. A compound is considered active if the C/T efficacy ratio of two consecutive tests is equal to or greater than 1.43. In a representative operation, the mean C/T efficacy ratio (four rats) in the described test for the above compound was 2.16 and 1.81.

The invention will be described in greater detail in conjunction with the following specific examples.

EXAMPLE 1

Preparation of (±)-1,2,3,4-tetrahydro-6-methoxy-1-[2-(4-methoxy-1,4-cyclohexadien-1-yl)ethyl]-2-methyl-7-isoquinolinol 7-(Benzyloxy)-1,2,3,4-tetrahydro-6-methoxy-1-(p-methoxy-phenethyl)-2-methylisoquinoline hydrochloride (9.5 g.) was added to a solution of 100 ml. of liquid ammonia containing 50 ml. of tetrahydrofuran and 50 ml. of t-butanol in a dry ice and methanol bath. The mixture was stirred and 2.5 g. of lithium wire was added, in small pieces, over 10 minutes. The stirring was continued for 4.5 hours in the cold bath followed by slow addition of 25 ml. of methanol to destroy the excess lithium. The ammonia was allowed to evaporate and then 200 ml. of saturated aqueous ammonium chloride solution was added. The resulting solution was extracted with three 100-ml. portions of chloroform and the combined extracts were washed with saturated salt solution and then dried over magnesium sulfate. Evaporation of the solution under reduced pressure gave an oil which was crystallized from ether to yield 4.7 g. of (±)-1,2,3,4-tetrahydro-6-methoxy-1-[2-(4-methoxy-1,4-cyclohexadien-1-yl)ethyl]-2-methyl-7-isoquinolinol as white crystals, m.p. 111°-113.5°C.

EXAMPLE 2

Preparation of (±)-1,2,3,8,9,9a-Hexahydro-6-Hydroxy-5-Methoxy-1-Methylspiro[7H-Benzo[de]Quinoline-7,1'-Cyclohexane]-4'-One A solution of 3.2 g. of (±)-1,2,3,4-tetrahydro-6-methoxy-1-[2-(4-methoxy-1,4-cyclohexadien-1-yl)ethyl]-2-methyl-7-isoquinolinol in 60 ml. of 85 percent phosphoric acid was heated on a steam bath for 4.0 hours, cooled and poured onto ice. The aqueous solution was brought to pH 8–9 by careful addition of 150 ml. of concentrated ammonium hydroxide solution and then extracted with five 100-ml. portions of chloroform. The combined chloroform extracts were washed with saturated salt solution and dried over magnesium sulfate. Evaporation of the solution under reduced pressure left a glass which was triturated with ether to give 1.7 g. of (±)1,2,3,8,9,9a-hexahydro-6-hydroxy-5-methoxy-1-methylspiro[7H-benzo[de]quinoline-7,1'-cyclohexane]-4'-one as white crystals, m.p. 190°–200°C. dec. which, after crystallization from ethanol, had m.p. 206°–211°C. dec.

EXAMPLE 3

Preparation of (±)-1,2,3,4-tetrahydro-6-methoxy-1-[2-(4-methoxy-1,4-cyclohexadien-1-yl)methyl]-2-methyl-7-isoquinolinol 7-(benzyloxy)-1,2,3,4-tetrahydro-6-methoxy-1-(p-methoxybenzyl)-2-methylisoquinoline hydrochloride (27.0 g.) was added to a solution of 300 ml. of liquid ammonia containing 150 ml. of t-butanol and 150 ml. of tetrahydrofuran in a dry ice/methanol bath. Lithium wire (7.0 g.) was added over 15 minutes and the resulting mixture was stirred for 4.0 hours. This reaction was worked up in a manner similar to that of example 1 to give 14.7 g. of product as an oil. Crystallization from ether gave (±)-1,2,3,4-tetrahydro-6-methoxy-1-[2-(4-methoxy-1,4-cyclohexadien-1-yl)-methyl]-2-methyl-7-isoquinOlinol as white crystals, m.p. 78°–80°C.

EXAMPLE 4

Preparation of (±)-trans-cisoid and trans-transoid-4,5,6,6a,7,78,9,11,11a-decahydro-1-hydroxy-2-methoxy-6-methyl-10H-dibenzo-[de,g]quinolin-10-ones (±)-1,2,3,4-tetrahydro-6-methoxy-1-[2-(4-methoxy-1,4-cyclohexadien-1-yl)methyl]-2-methyl-7-isoquinolinol (9.2 g.) was dissolved in 160 ml. of 85 percent phosphoric acid and heated on a steam bath for 3.0 hours, cooled, poured onto ice and brought to pH 8–9 by carefully adding 400 ml. of concentrated ammonium hydroxide. The mixture was extracted with three 250-ml. portions of chloroform and the combined extracts were washed with saturated salt solution and dried over magnesium sulfate. Removal of the solvent under reduced pressure gave an oil which was crystallized from acetonitrile using activated charcoal to give 3.6 g. of product. Recrystallization from acetonitrile afforded 2.6 g. of a mixture of two different types of tan crystals.

1 gram of the above mixture was chromatographed on 675 g. of diatomaceous earth using heptane:ethyl acetate:diethylamine:water (75:25:15:6) as the solvent system. The two main fractions which were obtained were evaporated to give 0.206 g. of fraction A and 0.645 g. of fraction B. Fraction B was crystallized from ethanol using activated charcoal to give 0.330 g. of off-white crystals, m.p. 161°–163°C., of the major isomer of (±)-trans-cisoid and trans-transoid-4,5,6,6a,7,7a,8,9,11,11a-decahydro-1-hydroxy-2-methoxy-6-methyl-10H-dibenzo[de,g]quinolin-10-ones.

Fraction A was combined with 0.184 g. of equivalent material obtained from a similar run and crystallized from ether and then recrystallized from chloroform:hexane to afford 0.109 g. of off-white crystals, m.p. 176°–178°C., of the minor isomer of (±)-trans-cisoid and trans-transoid-4,5,6,6a,7,7,8,9,11,11a-decahydro-1-hydroxy-2-methoxy-6-methyl-10H-dibenzo[de,g]quinolin-10-ones.

In accordance with accepted convention, an α-substituent at the 9a-position in (I) or at the 6a-position in (II) is behind the plane of the paper whereas a β-substituent is in front of the plane of the paper. This is usually represented by a --- bond for an α-substituent, a — bond for a β-substituent, and a bond where both are indicated. In the structural formulas and reaction schemes set forth hereinabove, this convention has been consistently employed throughout.

We claim:

1. A compound selected from the group consisting of those of the formula:

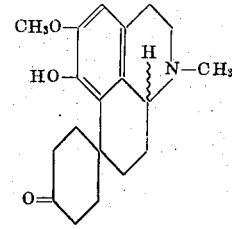

and the non-toxic acid-addition salts thereof.

2. A compound selected from the group consisting of those of the formula:

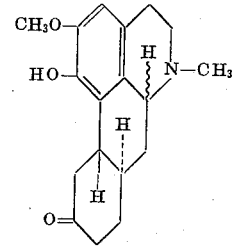

and the non-toxic acid-addition salts thereof.

3. The compound (±)-1,2,3,4-tetrahydro-6-methoxy-1-[2-(4-methoxy-1,4-cyclohexadien-1-yl)ethyl]-2-methyl-7-isoquinolinol.

4. The compound (±)-1,2,3,4-tetrahydro-6-methoxy-1-[2-(4-methoxy-1,4-cyclohexadien-1-yl)methyl]-2-methyl-7-isoquinolinol.

* * * * *

UNITED STATES PATENT OFFICE
CERTIFICATE OF CORRECTION

Patent No. 3,673,189                    Dated June 27, 1972

Inventor(s) William Vincent Curran, Leon Goldman

It is certified that error appears in the above-identified patent and that said Letters Patent are hereby corrected as shown below:

In abstract, the first drawing

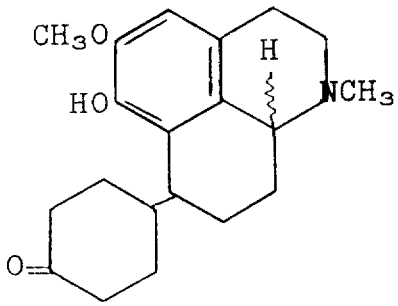

should be.

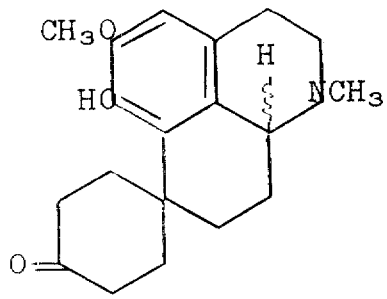

Signed and sealed this 23rd day of January 1973.

(SEAL)
Attest:

EDWARD M. FLETCHER, JR.            ROBERT GOTTSCHALK
Attesting Officer                   Commissioner of Patents